US012799258B2

(12) United States Patent
Suzuki

(10) Patent No.: US 12,799,258 B2
(45) Date of Patent: Nov. 17, 2026

(54) WATER SOLUBLE RESOL-TYPE PHENOL RESIN

(71) Applicant: SUMITOMO BAKELITE CO., LTD., Tokyo (JP)

(72) Inventor: Yuji Suzuki, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 587 days.

(21) Appl. No.: 18/024,562

(22) PCT Filed: Aug. 25, 2021

(86) PCT No.: PCT/JP2021/031107

§ 371 (c)(1),
(2) Date: Mar. 3, 2023

(87) PCT Pub. No.: WO2022/050143

PCT Pub. Date: Mar. 10, 2022

(65) Prior Publication Data

US 2023/0331895 A1 Oct. 19, 2023

(30) Foreign Application Priority Data

Sep. 7, 2020 (JP) ................................ 2020-149620

(51) Int. Cl.
*C08G 8/10* (2006.01)
*C08G 61/06* (2006.01)

(52) U.S. Cl.
CPC ............... *C08G 8/10* (2013.01); *C08G 61/06* (2013.01)

(58) Field of Classification Search
None
See application file for complete search history.

(56) References Cited

U.S. PATENT DOCUMENTS

| | | | | | |
|---|---|---|---|---|---|
| 3,956,205 | A * | 5/1976 | Higginbottom | C08J 3/03 528/143 |
| 4,314,050 | A * | 2/1982 | Girgis | C08G 8/22 528/137 |
| 5,446,089 | A * | 8/1995 | Shiau | C08L 97/02 524/541 |
| 2004/0039093 | A1 * | 2/2004 | Gabrielson | C03C 25/34 524/211 |
| 2021/0214548 | A1 | 7/2021 | Albertelli | |

FOREIGN PATENT DOCUMENTS

| | | | | | |
|---|---|---|---|---|---|
| CN | 102030875 | A | | 4/2011 | |
| JP | 2003137948 | A | * | 5/2003 | |
| JP | 2004-307815 | A | | 11/2004 | |
| JP | 2005-53959 | A | | 3/2005 | |
| JP | 2005-162963 | A | | 6/2005 | |
| JP | 4013111 | B2 | | 11/2007 | |
| JP | 2018-150464 | A | | 9/2018 | |
| KR | 101674969 | B1 | * | 11/2016 | C08J 3/20 |
| WO | 2019-229437 | A1 | | 12/2019 | |

OTHER PUBLICATIONS

International Search Report dated Oct. 26, 2021, issued in counterpart International Application No. PCT/JP2021/031107 (2 pages).

* cited by examiner

*Primary Examiner* — Lee E Sanderson
(74) *Attorney, Agent, or Firm* — WHDA, LLP

(57) ABSTRACT

Provided is a water soluble resol-type phenol resin, in which an unreacted phenol content is 0.1% by mass or less and an unreacted aldehyde content is 0.1% by mass or less.

2 Claims, No Drawings

WATER SOLUBLE RESOL-TYPE PHENOL RESIN

TECHNICAL FIELD

The present invention relates to a water soluble resol-type phenol resin with reduced formaldehyde and phenol contents.

BACKGROUND ART

A phenol resin is a typical thermosetting resin used in many fields due to high heat resistance and mechanical strength of a cured product thereof. The phenol resin is used, for example, by impregnating or applying to various substrates, or as a binder for various organic and inorganic substrates. The phenol resins are roughly divided into a novolac-type phenol resin which is cured by heating with addition of a curing agent such as hexamethylenetetramine and a resol-type phenol resin which is cured by heating alone, and the phenol resin is used properly depending on the properties, applications, purpose, and the like.

Among these phenol resins, in a case where ammonia-free or solvent-free is required for environmental friendliness and work environment improvement, the resol-type phenol resin, which is highly hydrophilic, is usually used for applications used in a form of aqueous solution or emulsion. The water soluble resol resin is used, for example, as a binder for coated abrasives. The resol resin is excellent in abrasive grain retention and heat resistance, and high abradability is obtained.

However, the resol-type phenol resin contains unreacted phenols and aldehydes, which are undesirable substances from the viewpoint of protecting atmospheric environment and protecting human environment. In order to obtain a resol-type phenol resin with a reduced formaldehyde content, it is sufficient to react an excessive amount of phenols with aldehydes. However, since the resol-type phenol resin obtained by using the excessive amount of phenols contains a large amount of unreacted phenols, the resol-type phenol resin is poorly cured, and in a cured product to be obtained, mechanical strength which is required by the market is not satisfied. In addition, since the resol-type phenol resin obtained by using the excessive amount of phenols with respect to aldehydes contains a large amount of unreacted phenols, it is not desirable to use the resol-type phenol resin in environmental and occupational safety.

As a technique for solving the above-described problem, Patent Document 1 discloses a method for producing a resol resin, in which amounts of unreacted monomers such as formaldehyde and phenol can be reduced. Patent Document 1 discloses that, by using, at a specific ratio, the number of moles of a phenol component in a novolac resin and an alkali metal hydroxide as a catalyst, and by reacting aldehydes and phenols at a specific proportion, a content of unreacted phenols is controlled.

RELATED DOCUMENT

Patent Document

[Patent Document 1] Japanese Patent No. 4013111

SUMMARY OF THE INVENTION

Technical Problem

However, although the method disclosed in Patent Document 1 can reduce the content of unreacted phenols to a very low level, an unavoidable amount of unreacted formaldehyde remains.

Solution to Problem

An object of the present invention is to provide a water soluble resol-type phenol resin in which remaining amounts of unreacted monomers, both phenol and aldehyde, are remarkably reduced.

According to the present invention, a water soluble resol-type phenol resin having an unreacted phenol content of 0.1% by mass or less and an unreacted aldehyde content of 0.1% by mass or less is provided.

Advantageous Effects of Invention

According to the present invention, a water soluble resol-type phenol resin with a wider range of applications, in which remaining amounts of both unreacted phenol and unreacted aldehyde are reduced and load on environment and load on human body are reduced, is provided.

DESCRIPTION OF EMBODIMENTS

Hereinafter, embodiments of the present invention will be described.

The resol-type phenol resin according to the present embodiment is a water soluble phenol resin, in which an unreacted phenol content is 0.1% by mass or less and an unreacted aldehyde content is 0.1% by mass or less.

The resol-type phenol resin according to the present embodiment is produced by reacting a novolac-type phenol resin (A) with aldehydes in the presence of a catalyst under specific reaction conditions. The novolac-type phenol resin (A) used for producing the resol-type phenol resin according to the present embodiment is obtained by a reaction of phenols and aldehydes. In this case, by controlling a content and of unreacted phenols remaining in the novolac-type phenol resin and a molecular weight, unreacted phenol and unreacted aldehyde which remain in the resol-type phenol resin finally obtained can be reduced.

The above-described novolac-type phenol resin (A) can be produced, for example, through the following process. First, phenols and aldehydes are reacted at 100° C. for 1 to 5 hours in the presence of an acid catalyst. Thereafter, unreacted phenol contained in the obtained reaction mixture is azeotropically removed at a temperature of 150° C. to 180° C. under reduced pressure while adding water successively. A content of the unreacted phenol remaining in the novolac-type phenol resin is preferably 0.1% by mass or less, more preferably 0.09% by mass or less, and still more preferably 0.08% by mass or less, and it is particularly preferable to reduce the amount up to approximately 0.01% by mass.

In addition, in the production of the novolac-type phenol resin (A), a proportion of phenols and formaldehydes is preferably [formaldehyde]/[phenols]=0.3 to 0.6 [molar ratio], and more preferably 0.4 to 0.5. The production can be performed even in a case where the molar ratio is less than 0.3, but the yield is poor as the molar ratio decreases, which is not preferable economically. On the other hand, in a case of exceeding 0.6, it is difficult to adjust the molecular weight of the novolac-type phenol resin as a product, which is not preferable.

The phenols used as a raw material to produce the novolac-type phenol resin (A) are not particularly limited, and examples thereof include phenol; alkylphenols such as cresol, xylenol, ethylphenol, butylphenol, and octylphenol; polyhydric phenols such as resorcin and catechol; halogenated phenols such as fluorophenol, chlorophenol, bromophenol, and iodophenol; monohydric phenol substituents such as phenylphenol, aminophenol, nitrophenol, dinitrophenol, and trinitrophenol; and naphthol. In addition, these phenols are not limited to only one type in use, and two or more types thereof can be used in combination. Resorcin or phenol is preferable in order to obtain a water soluble resol-type phenol resin, which is the final target product, and phenol is preferable from the viewpoint of obtaining an inexpensive product.

As the aldehydes used as a raw material for producing the novolac-type phenol resin (A), formaldehydes such as formaldehyde, paraformaldehyde, and trioxane, acetaldehyde, and the like, which are commonly used in production of a phenol resin, are effective. In addition, Urotropine can also be used. Among these, formaldehyde is preferable. As the aldehydes, one type may be used alone, or two or more types thereof may be used in combination.

As the acid catalyst used for producing the novolac-type phenol resin (A), acids commonly used in production of novolac resin can be used, and examples thereof include oxalic acid, hydrochloric acid, phosphoric acid, sulfuric acid, paratoluenesulfonic acid, phenolsulfonic acid, and zinc acetate, zinc octylate, and the like, which are a catalyst for a high-orthonovolac resin.

As the novolac-type phenol resin (A), so-called modified novolac resin, which is obtained by reacting phenol with, for example, an epoxy resin, triazines, and the like in an arbitrary proportion during the process of synthesizing the novolac resin, can also be used. In a case where the novolac resin modified with these is used as a raw material for producing the resol resin, it is possible to impart water resistance and heat resistance to the resol resin produced the method of the present invention.

The resol-type phenol resin according to the present embodiment can be produced using the above-described novolac-type phenol resin (A) according to the following method.

The resol-type phenol resin according to the present embodiment can be produced by reacting the above-described novolac-type phenol resin (A) with aldehydes in the presence of a basic catalyst. As the basic catalyst, alkali metal hydroxides such as lithium hydroxide, sodium hydroxide, and potassium hydroxide; alkaline earth metal hydroxides such as magnesium hydroxide, calcium hydroxide, barium hydroxide; primary amines such as ammonia and monoethanolamine; secondary amines such as diethanolamine; tertiary amines such as trimethylamine, triethylamine, triethanolamine, and diazabicycloundecene; zinc acetate; or the like can be used. Among these, it is preferable to use an alkali metal hydroxide, and it is particularly preferable to use sodium hydroxide. These catalysts may be reacted singly or in combination of two. Furthermore, sulfuric acid, hydrochloric acid, phosphoric acid, paratoluenesulfonic acid, and the like may be used for the purpose of neutralizing the catalyst.

A molar ratio of (aldehyde)/[novolac-type phenol resin], which is a ratio of the novolac-type phenol resin (A) and the aldehydes in the production of the resol-type phenol resin according to the present embodiment, is preferably 0.5 or more from the viewpoint that an unreacted novolac-type phenol resin component does not remain and physical properties of the obtained resol-type phenol resin, such as curability, are good, and it is preferably 4.0 or less from the viewpoint that the unreacted formaldehyde does not remain and viewpoint of preferred environmental measures. From the viewpoint of further reducing the amount of the unreacted formaldehyde remaining in the obtained resol-type phenol resin, the molar ratio of [aldehyde]/[novolac-type phenol resin] is more preferably 1.0 to 2.5 (molar ratio), and particularly preferably 1.5 to 2.0 (molar ratio). The molar ratio of [aldehyde]/[novolac-type phenol resin] can be adjusted by weighing the weight of the used novolac-type phenol resin (A) and the weight of the aldehyde to be target number of moles based on information of a number-average molecular weight Mn obtained by a GPC measurement of the novolac-type phenol resin (A) obtained by the above-described method, and of a molecular weight of the used aldehyde.

The basic catalyst is preferably an alkali metal hydroxide, and it is preferable that the alkali metal hydroxide is used with respect to the novolac-type phenol resin (A) used as a raw material in an amount of a value of [number of moles of novolac-type phenol resin]/[number of moles of alkali metal] of 5 to 15, preferably 8 to 12. By using the alkali metal hydroxide catalyst in the above-described amount, the remaining amount of unreacted aldehydes can be reduced. Here, the number of moles of the novolac-type phenol resin can be calculated from the number-average molecular weight Mn obtained by the GPC measurement of the novolac-type phenol resin (A) and the weight of the used novolac-type phenol resin. In addition, the number of moles of the alkali metal can be obtained from the molecular weight of the used alkali metal hydroxide. Therefore, the value of [number of moles of novolac-type phenol resin]/[number of moles of alkali metal] can be controlled into the target range by adjusting the amount of the used novolac-type phenol resin (A) and the amount of the alkali metal hydroxide as a catalyst.

The aldehyde used in the production of the resol-type phenol resin according to the present embodiment and the alkali metal hydroxide as the basic catalyst are used in amounts of the above-described molar ratios, based on the number-average molecular weight of the novolac-type phenol resin. As a result, the amount of aldehyde remaining as an unreacted substance in the obtained resol-type phenol resin can be highly controlled.

A more specific method for producing the resol-type phenol resin according to the present embodiment includes the following. First, oxalic acid as a reaction catalyst is added to a mixture of phenol and a 37% concentration formaldehyde aqueous solution, the temperature in the reaction system is set to 100° C., and after performing a reaction for 1 to 5 hours, the temperature is set to 150° C. to perform distillation under reduced pressure while adding methanol successively, thereby obtaining the novolac-type phenol resin (A). The amount of residual phenol in the obtained novolac-type phenol resin (A) is 0.1% by mass or less, more preferably 0.09% by mass or less and still more preferably 0.08% by mass or less.

Next, a 48% concentration sodium hydroxide as a catalyst is added to a mixture of the novolac-type phenol resin (A) obtained by the above-described reaction and a 37% concentration formaldehyde aqueous solution mixed in a proportion of [aldehydes]/[phenols]=0.3 to 0.6 [molar ratio], and a reaction is performed for 1 to 5 hours at a temperature of 50° C. to 80° C. to obtain the resol-type phenol resin. The amount of residual phenol in the resol-type phenol resin thus obtained is 0.1% by mass or less, preferably 0.09% by mass or less and more preferably 0.08% by mass or less with respect to the resin. In addition, the amount of residual aldehyde in the resol-type phenol resin is 0.1% by mass or less, preferably 0.09% by mass or less and more preferably 0.08% by mass or less with respect to the resin.

The resol-type phenol resin according to the present embodiment is provided in a form of aqueous solution produced by the above-described method. Here, the form of aqueous solution means that the obtained resol-type phenol resin aqueous solution is substantially free of an organic solvent such as methanol, which is used in the production process. The "substantially free of an organic solvent" means that the resol-type phenol resin aqueous solution contains an organic solvent in an amount of 0.1% by mass or less.

The embodiments of the present invention have been described above, but these are examples of the present invention and various configurations other than the above can be adopted.

EXAMPLES

Hereinafter, the present invention will be described with reference to Examples and Comparative Examples, but the present invention is not limited thereto.

Example 1

A stirrer and a thermometer were set in a 2-liter four-necked flask, 400 g of phenol and 0.4 g of oxalic acid dihydrate were charged, the temperature was raised to a reflux temperature (100° C.), and 138 g of 37% formalin was added dropwise thereto over 1 hour. After reacting at the reflux temperature for 1 hour, the mixture was distilled off under normal pressure and heated to 100° C. Thereafter, the temperature was raised to 150° C. under a reduced pressure of 70 Torr, and phenol was azeotropically removed while dropping 40 g of water over 1 hour under reduced pressure. In a case where the obtained reaction mixture was measured by GPC, a number-average molecular weight of the produced novolac-type phenol resin was 500. In addition, in a case where the obtained reaction mixture was measured by gas chromatography, an amount of unreacted phenol was 0.1% by mass. The obtained reaction mixture was cooled to 60° C., 18 g of a 505 sodium hydroxide aqueous solution and 24.2 g of 37% formalin (molar ratio of [novolac-type phenol resin]/[sodium hydroxide]=11) were added thereto, a reaction was performed at 60° C. for 1 hour, and 64 g of water was added thereto, thereby obtaining a resol-type phenol resin in a form of aqueous solution. A non-volatile content at 135° C. was 68%, miscibility with water was 210%, an amount of unreacted phenol measured using gas chromatography was below the detection limit (0.1% by mass), and an amount of unreacted formaldehyde was 0.07% by mass.

In the resol-type phenol resin obtained in Example 1, since the remaining amount of unreacted phenol and the remaining amount of unreacted formaldehyde are both 0.1% by mass or less, the resol-type phenol resin is excluded from the application of Ordinance on Prevention of Hazards Due to Specified Chemical Substances from Industrial Safety and Health Act (hereinafter, referred to as "Ordinance on Specified Chemical Substances from Industrial Safety and Health Act").

Comparative Example 1

A stirrer and a thermometer were set in a 2-liter four-necked flask, 941 g of phenol and 40.3 g of 37.2% formalin were charged, 8.82 g of oxalic acid dihydrate was added thereto, the temperature was raised to a reflux temperature (100° C.), and 362.9 g of 37.2% formalin was further added dropwise thereto over 1 hour. After reacting at the reflux temperature for 3 hours, distillation was started and the temperature was raised to 180° C. Thereafter, the temperature was raised to 220° C. and distillation under reduced pressure of 50 torr (6.65 kPa) was performed for 1 hour, thereby obtaining a novolac resin (Ia) in which a softening point of B & R method was 75° C., an amount of unreacted phenol measured by gas chromatography was 0.3% by mass, and a number-average molecular weight by GPC was 780. The novolac-type phenol resin was diluted with methanol to a solid content of 80%, and a methanol solution of the novolac resin (Ia) was tested below. Next, 131.3 g of the methanol solution of the novolac-type phenol resin (Ia) obtained above and 60.8 g of 37% formalin were thoroughly mixed, 10.5 g of 48% sodium hydroxide (molar ratio of [novolac-type phenol resin]/[sodium hydroxide]=0.44) was added thereto, and the temperature was raised to 70° C. After reacting at 70° C. for 4 hours, the mixture was cooled to obtain an aqueous solution of a resol-type phenol resin (IIa). The resin had a non-volatile content of 50.8% at 135° C.; and a gelling time of 68 seconds at 150° C. Miscibility of the resin with water (measurement method: addition amount which caused turbidity was indicated in a case where 32 g of water was added to 10 g of the resin at 25° C. the same applies hereinafter) was 320%, and the unreacted phenol measured by GPC was below the detection limit. In addition, an amount of unreacted phenol measured by gas chromatography was 0.02% by mass. An amount of unreacted formaldehyde measured by gas chromatography was 0.6% by mass. In addition, a bonding molar ratio of the resin measured by $^{13}$C-NMR was 1.49.

In the resol-type phenol resin obtained in Comparative Example 1, since the remaining amount of unreacted formaldehyde is more than 0.1% by mass, the resol-type phenol resin is applied to the Ordinance on Specified Chemical Substances from Industrial Safety and Health Act, and more strict work management is required.

Comparative Example 2

A stirrer and a thermometer were set in a 2-liter four-necked flask, 941 g of phenol and 40.3 g of 37.2% formalin were charged, 8.82 g of oxalic acid dihydrate was added thereto, the temperature was raised to a ref lux temperature of 100° C., and 202.7 g of 37% formalin was further added dropwise thereto over 1 hour. After reacting at the reflux temperature for 5 hours, distillation was started and the temperature was raised to 180° C. Thereafter, the temperature was raised to 220° C. and distillation under reduced pressure of 50 torr (6.65 kPa) was performed for 1 hour, thereby obtaining a novolac resin (Ib) in which a softening point of a ring and ball method (B & R method) was 45° C., an amount of residual phenol measured by gas chromatography was 0.1% by mass, a number-average molecular weight by GPC was 610, and a bonding molar ratio obtained by $^{13}$C-NMR was 0.75. The novolac resin (Ib) was diluted with methanol to a solid content of 80% and tested. 131.3 g of the methanol solution of the novolac resin (Ib) obtained above and 36.5 g of 37% formalin were thoroughly mixed, 10 g of 48% sodium hydroxide (molar ratio of [novolac-type phenol resin]/[sodium hydroxide]=0.50) was added thereto, and the temperature was raised to 70° C. After reacting at 70° C. for 4 hours, the mixture was cooled to room temperature to obtain an aqueous solution of a resol-type phenol resin (lib). The resin had a viscosity of 1020 mPa·s (25° C.), a gelling time of 110 seconds at 150° C., a non-volatile content of 68% at 135° C., and a miscibility with water of 250%. The content of residual phenol measured by GPC was below the detection limit, and the unreacted phenol measured by gas chromatography (GC) was 0.01% by mass. An amount of unreacted formaldehyde measured by gas chromatography was 0.3% by mass. A bonding molar ratio of the resin measured by $^{13}$C-NMR was 1.20.

In the resol-type phenol resin obtained in Comparative Example 2, since the remaining amount of unreacted formaldehyde is more than 0.1% by mass, the resol-type phenol resin is applied to the Ordinance on Specified Chemical Substances from Industrial Safety and Health Act, and more strict work management is required.

Priority is claimed on Japanese Patent Application No. 2020-149620, filed on Sep. 7, 2020, the disclosure of which is incorporated herein by reference.

The invention claimed is:

1. A water soluble resol-type phenol resin, wherein an unreacted phenol content is 0.1% by mass or less, and an unreacted formaldehyde content is 0.1% by mass or less, wherein the water soluble resol-type phenol resin is obtained by a method comprising;

reacting a phenol and a first formaldehyde in the presence of an acid catalyst to obtain a reaction mixture including a novolac-type phenol resin and unreacted phenol, wherein the molar ratio of the phenol and the first formaldehyde is [first formaldehyde]/[phenol]=0.4 to 0.5, azeotropically distilling the mixture to remove the unreacted phenol to obtain the novolac-type phenol resin, reacting the novolac-type phenol resin and a second formaldehyde in the presence of a basic catalyst to obtain the water soluble resol-type phenol resin, wherein the basic catalyst is an alkali metal hydroxide, and the alkali metal hydroxide is used with respect to the novolac-type phenol resin in an amount of a value of [number of moles of novolac-type phenol resin]/[number of moles of alkali metal] of 8 to 12.

2. The water soluble resol-type phenol resin according to claim 1, wherein the water soluble resol-type phenol resin is substantially free of organic solvents.

* * * * *